Sept. 27, 1955  G. E. MATHIAS  2,719,256
SLIP REGULATOR CONTROL FOR INDUCTION MOTORS
Filed April 12, 1954
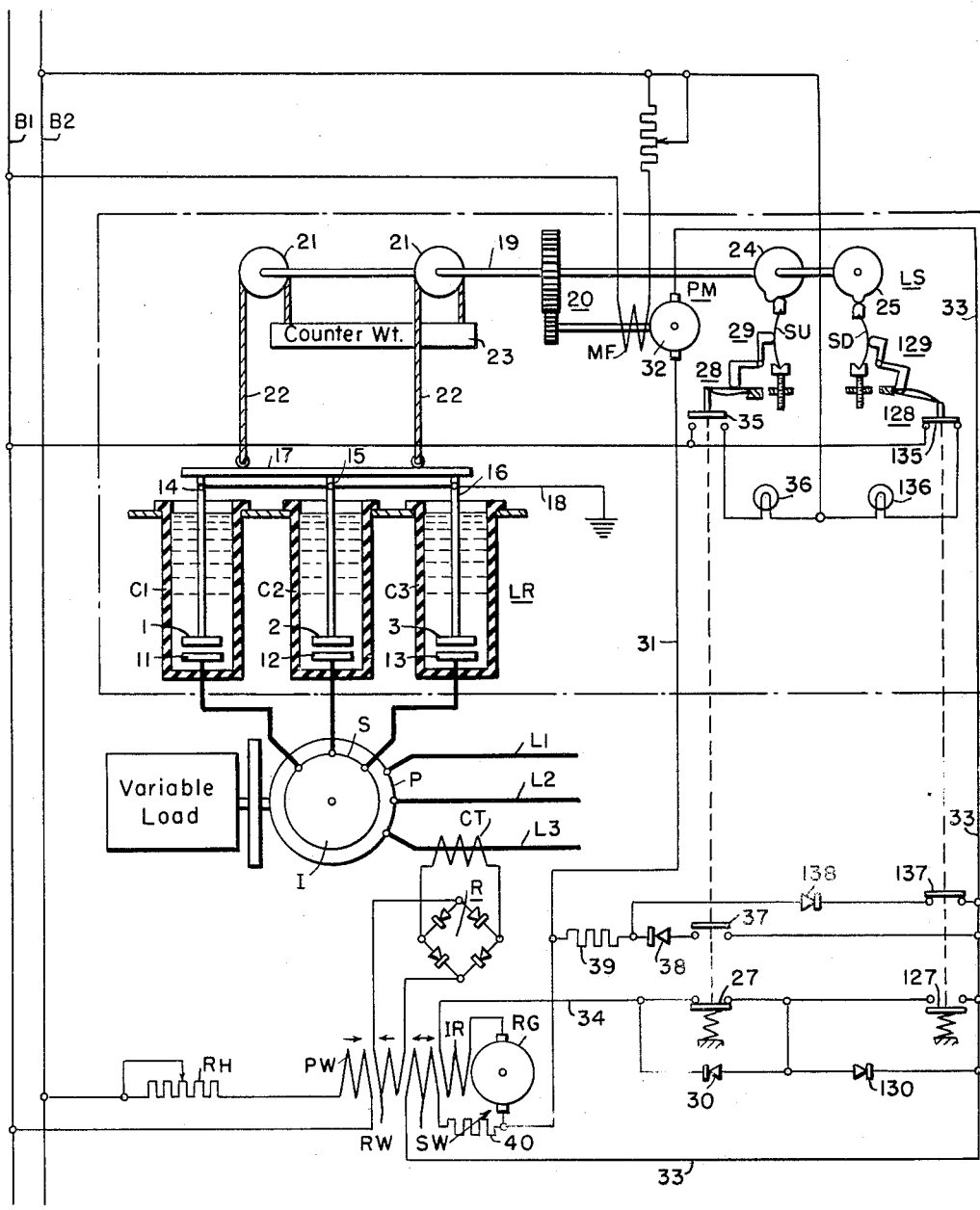
WITNESSES:
E. A. McCloskey.
Leon M. Garman
INVENTOR
Gerald E. Mathias.
BY Paul E. Friedemann
ATTORNEY

United States Patent Office 2,719,256
Patented Sept. 27, 1955

2,719,256

SLIP REGULATOR CONTROL FOR INDUCTION MOTORS

Gerald E. Mathias, Williamsville, N. Y., assignor to Westinghouse Electric Corporation, East Pittsburgh, Pa., a corporation of Pennsylvania Application April 12, 1954, Serial No. 422,488

8 Claims. (Cl. 318—241)

This invention relates generally to electrical control apparatus and systems for electric motors, and more in particular to such systems and apparatus which are utilized in the control of wound rotor induction motors.

This invention is directed to certain improvements in the control disclosed and claimed in the copending application of Walter Schaelchlin et al., Serial No. 281,956, filed April 12, 1952, and entitled Electrical Apparatus.

To understand the general aims of this invention and the objects of this invention herein expressed, a brief statement explaining the main apparatus involved in the earlier filed copending application may be helpful. In the earlier filed application a wound rotor induction motor is shown coupled to a suitable but highly variable load, as a bloaming mill. The secondary winding of this motor is connected to a liquid rheostat for regulating the slip by movement of the electrodes of the rheostat relative to each other.

A relatively small pilot motor, through suitable reduction gearing, drives the movable counter-weighted electrodes toward and away from the fixed electrodes depending on the direction of the electrical intelligence signal received by the pilot motor. The electrical signal is produced by a regulating generator having an output voltage that varies in magnitude in proportion to the magnitude of the departure of the induction motor load current from a selected value. The polarity of the regulating generator is determined by the direction of the departure of the induction motor load current from the selected value.

Some difficulty is experienced in obtaining accurate control particularly at the extreme limits of electrode travel. The difficulty is particularly noticeable for the electrode travel approaching the point of minimum electrode separation. For a desired minimum electrode separation of one-quarter inch, a variation of one-eighth inch is a very large error. Same pilot motor drift is unavoidable and is dependent upon the pilot motor speed at the time the intended limit is reached. Dynamic braking and the inherent friction in the drive bring the pilot motor to rest. The drift is greater, however, when stopping from a high speed, than when stopping from a low speed.

In the showing of the copending case the pilot motor armature and its dynamic braking resistor are in a parallel circuit with reference to the regulating generator and to which parallel circuit the regulating generator must supply energy. A dynamic braking resistor of low ohmic value is ideal for the more effective dynamic braking action but the choice of such a dynamic braking resistor would make proper pilot motor operation at either limit of travel very difficult because the major portion of the current supplied by the regulating generator would not flow through the pilot motor armature but would flow through the dynamic braking resistor. Sluggish operation results at the very time the highest dependable slip regulation is desired. Since in many applications nearly all the regulating duty is accomplished in the first inch or two of electrode travel accurate rapid response is thus highly desirable.

One broad object of this invention is the provision of highly accurate and dependable operation of a motor in a desired manner when its rotor is in a particular angular position.

Another broad object of this invention is to provide a slip regulator system for an induction motor in which the speed of response and the speed of correction is increased.

A further object of this invention is to provide a slip regulator of the character referred to in which a control of the secondary resistance of the motor is obtained in dependence of motor current and in dependence of the position of the moving electrode with respect to the stationary electrode.

Further to the preceding object, it is an object of this invention to provide a slip regulator of the character referred to in which a relatively small pilot motor may be utilized to drive the moving electrodes of the liquid rheostat.

The foregoing statements are merely illustrative of the various aims and objects of this invention. Other objects and advantages will become apparent from a study of the following disclosure when considered in conjunction with the accompanying drawing, in which the single figure is a diagrammatic illustration of a slip regulator system embodying the principles of this invention.

Referring now to the single figure, an induction motor I of the wound rotor type is connected to drive a variable load. This induction motor is provided with a primary winding designated P adapted for connection to a three phase supply of alternating current through the conductors L1, L2 and L3. The secondary winding S of this induction motor is connected to a liquid rheostat, generally designated LR, which is utilized to control the resistance of the secondary winding circuit of the induction motor to thereby control its speed.

The liquid rheostat is comprised of three separate cells designated C1, C2 and C3. Each of these cells is filled with a suitable electrolyte, such as sodium carbonate solution, which is adapted to carry current from the respective movable electrodes 1, 2 and 3 to the respective stationary electrodes 11, 12 and 13, which latter are respectively connected to the separate phases of the secondary winding circuit of the induction motor. The moving electrodes are connected by means of conducting rods 14, 15 and 16, respectively, to a supporting bar 17 which mechanically connects the moving electrode assemblies together for simultaneous movement. A conductor 18, which is grounded electrically, connects the three conducting rods together, forming a grounded neutral for the circuit.

Supporting bar 17 is actuated by a drive which is powered by a pilot motor, generally designated PM. This pilot motor is connected to a shaft 19 through a reduction gear drive, generally designated 20. Shaft 19 is provided with a pair of sprockets, or cable wheels, 21 over which the cables 22, which are connected to symmetrically spaced points on the supporting bar, are disposed. The ends of cables 22 are connected to a counterweight 23 which partially balances the load of the moving electrode assembly. Shaft 19 is also connected to operate a limit switch assembly, generally designated LS. This limit switch assembly is operated by a pair of cams 24 and 25, respectively, which operate the respective limit switches described more in detail hereinafter.

The control of the pilot motor, which drives the moving electrode, is obtained as a function of the primary current of the induction motor I, and as a function of the position of the moving electrodes of the liquid rheostat with respect to the stationary electrodes thereof. This control is obtained through a suitable amplifying device which may be either of the static type or the rotating type. In this illustration, a dynamoelectric machine type of amplifier RG, is employed. Amplifier RG is a direct current regulating generator which is provided with a load current compensating winding IR, a shunt connected winding SW, a regulating winding RW, and a pattern or reference winding PW. As indicated by the arrows adjacent the respective windings PW and RW, the ampere turns of these windings are opposed. The arrangement is such that if the ampere turns of one of the windings predominates that of the other, the output of the amplifier generator RG will be of a direction and magnitude corresponding to the magnitude and direction of the unbalance in ampere turns.

Prior to starting of the system, the moving electrodes 1, 2 and 3 will be spaced their maximum distance from the respective stationary electrodes 11, 12 and 13. When it is desired to start the induction motor I, power is applied to the direct current control buses B1 and B2, which supply excitation to the pattern winding PW of the regulating amplifier generator RG and to the field winding MF of pilot motor PM. At that time, the system is ready for connection of the induction motor I to a supply of three-phase power represented in conductors L1, L2 and L3. The switching circuits, whereby such connections may be effected, have not been illustrated in the interest of simplicity, since any conventional switching arrangement may be utilized. The induction motor with this arrangement is thus started with maximum resistance in the secondary circuit, and the motor begins to accelerate the load connected thereto.

The amplifier generator RG, which at this time is primarily operating under the influence of the ampere turns of the pattern field winding PW, produces its maximum output, and has the polarity indicated at its armature terminals. If the pilot motor PM on the preceding operation stopped the electrodes in the upper limiting position, which is the usual and desired position when the equipment is to be started, then the arrangement is such that in this upper limiting position of the movable electrodes, the cams 24 and 25 will be displaced substantially 350° to 355° from the angular position indicated, in which case the high point on cam 24 will have bowed the spring SU more than indicated to thus trip the snap-action switch operating mechanism 29 to close contacts 35 and 37, and to open contacts 27. The high portion on cam 25 will on the other hand have relieved the end thrust on spring SD to thus cause the snap-action switch operating mechanism 129 to open contacts 135 and 137 and to close contacts 127.

Pattern field excitation is initiated when main motor starts and is in the direction to cause pilot motor to lower the electrodes. At the same time the current field excitation of the field RW is present to oppose the pattern field and thus tends to raise the electrodes.

Since the conductor 31 is positive and conductor 34 negative, it will be apparent that the self-exciting field winding SW is energized from the regulating generator by a circuit that may be traced from the positive conductor 31, the rheostat 40, field winding SW, conductor 33, contacts 127, rectifier 30, conductor 34, and field winding IR to the negative generator terminal.

When the electrodes have been moved down to the regulating position selected by the adjustment through rheostat RH in the excitation circuit of the pattern field winding, then the armature current of motor I will have risen to the value which is to be maintained constant. The current transformer CT will at this time, through the full-wave rectifier R supply just sufficient excitation to the control field winding RW to balance the excitation of the pattern field winding PW and what excitation is at that time produced by the field windings SW and IR. The result will be that the effective voltage of the regulating generator RG drops to zero and the pilot motor PM stops the electrodes in the desired position.

Since the load on motor I is a highly variable load it is apparent that the excitation of field winding RW will vary correspondingly with the changes in armature current.

If, for example, the armature current exceeds the desired value the polarity of the regulating generator RG is reversed. The pilot generator is then energized by a circuit that may be traced from the upper armature terminal of generator RG, now positive, through the field winding IR, conductor 34, contacts 27 and 127, conductor 33, armature 32 of the pilot motor to the negative conductor 31. From the circuit just traced and the reversal of the current through field SW it is apparent that the excitation effect of the field windings IR and SW is also reversed, but that the direction of the excitation of field winding RW, while increased, remains the same.

From the foregoing it is apparent that a very effective control system is provided for regulating for constant armature current for the induction motor I.

Most of the regulation occurs at relatively close spacing of the electrodes, namely for a spacing substantially as shown. Since the voltage of the regulating generator RG is rather small near the regulating point and since the pilot motor operates the electrodes through a reduction gear not much hunting is encountered, but if the electrodes 1, 2 and 3 move too close to the electrodes 11, 12 and 13 then the down limit switch mechanism 129 actuates the snap-action switch 128 to close contacts 135 and 137 and to open contacts 127. Since the current flow through the pilot motor armature 32 for the condition assumed is from conductor 31, through armature 32, conductor 33 toward conductor 34 it is apparent that the supply circuit from generator RG to armature 32 is opened at contacts 127. The blocking rectifier 130 prevents any current flow.

For the condition assumed, the lower terminal of armature 32 is positive. The dynamic braking circuit is thus established from the lower motor terminal through conductor 31, dynamic braking resistor 39, rectifier 138, contacts 137, conductor 33 to the negative terminal of armature 32.

It will be noted that the dynamic braking circuit is only established when stopping is to be effected nor does it in any way interfere with the normal starting and normal operation of the pilot motor.

For example, suppose the need arises to start from the limiting position shown then the upper armature terminal of generator RG is positive. Then conductor 33 is positive through wire 34, switch 27 and rectifier 130. But even though contacts 137 are closed the blocking rectifier 138 prevents the dynamic braking resistor 39 from shunting the armature 32. After movement of cam 25 through a relatively small angle contacts 137 open and contacts 127 close to shunt rectifier 130. For normal operation the dynamic braking circuit is open and during starting the rectifiers 38 and 138 block the shunting of the armature 32.

When the movable electrodes are moved to their upper limiting position, then contacts 27 open to disconnect the generator RG from the pilot motor PM and contacts 37 close to establish dynamic braking of the pilot motor.

Since the dynamic braking resistor is only effective when needed the response of the pilot motor is not the least bit sluggish, as was heretofore the case, and a dynamic braking resistor of extremely low resistance value may be selected to effect very rapid stopping of the pilot motor.

Although only one embodiment of the novel circuitry is shown, others may be devised following the teachings of this invention which fall within the scope of this invention.

I claim as my invention:

1. In a motor torque control system in combination, a wound-rotor induction motor, having primary and secondary windings, mechanically coupled to a variable load, a liquid rheostat having fixed electrodes connected to the motor secondary windings, movable electrodes for adjusting the resistance value of the liquid rheostat, supply conductors connected to the motor primary windings, a direct current pilot motor for operating the movable electrodes, a regulating direct-current generator having an adjustable pattern field, an adjustable regulating field, and a self-exciting field, a current transformer interconnected with a supply conductor, a rectifier connected to the output of the current transformer to thus rectify the output to produce a direct current as a function of the primary winding load current, circuit means for connecting the regulating field to the rectifier, said regulating field and pattern field being wound to produce opposing effects and the adjustment being such that for a selected load of the induction motor the direct-current output voltage will be zero, circuit means for so connecting the direct-current pilot motor to the direct-current generator that the direction of rotation and the speed of the pilot motor will be a function of the polarity and magnitude of the voltage of the direct-current generator, dynamic braking circuit means for the pilot motor, said circuit means including a resistor and two parallel branches, one branch including a blocking rectifier poled in one sense and switching means and the other branch including a blocking rectifier poled in an opposite sense and switching means, and means for selectively operating either of said switching means to effect dynamic braking through the resistor and the blocking rectifier selected by said switching means.

2. In a system of control, in combination, a wound-rotor induction motor having a primary winding and a secondary winding, a liquid rheostat having chamber means for containing the electrolyte and having fixed electrodes in the chamber means, said fixed electrodes being connected to the secondary winding, movable electrodes disposed in said chamber means for movement relative to the fixed electrodes to thus vary the effective resistance of the secondary winding, a direct-current pilot motor for operating the movable electrodes, a direct-current generator for energizing the pilot motor, said generator having a pattern field energized at a selected value, and having a control field, means for energizing the control field as a function of the load current in the primary winding of the motor, said pattern field and control field being disposed on the generator to oppose each other, the excitation adjustment of the two field windings being such that zero output voltage appears at the generator terminal when the induction motor is operating at a selected load current, circuit means so interconnecting the pilot motor and generator that the pilot motor moves the electrodes away from each other when the load current is above the selected value and are moved toward each other when the load current is below its selected value, dynamic braking circuit means for the pilot motor, said circuit means including a resistor and two parallel branches, one branch including a blocking rectifier poled in one sense and switching means and the other branch including a blocking rectifier poled in an opposite sense and switching means, and means for selectively operating either of said switching means responsive to the polarity of the pilot motor armature potential and the position of the armature to effect dynamic braking through the resistor and the blocking rectifier selected by said switching means.

3. In a system of control, in combination, a wound rotor induction motor having a primary winding connected to be energized from a suitable source of alternating current having a selected voltage and frequency and having a secondary winding provided with a liquid rheostat having relatively movable electrodes for varying the effective resistance of the secondary winding, a pilot motor for moving the electrodes of the rheostat relative to each other, and a generator having two opposing field windings energized respectively at a selected constant value and a value determined by the load current in the primary winding of the induction motor, the excitation effects being so adjusted that the generator has zero output voltage at a selected induction motor load current, said pilot motor being so coupled with the rheostat and so connected to the generator that the electrodes are separated upon a rise of induction motor load current above the selected load current and are moved toward each other when the induction motor load current is below said selected value, whereby the motor load current is kept substantially constant, regardless of the variations in load torque, dynamic braking circuit means for the pilot motor, said circuit means including a resistor and two parallel branches, one branch including a blocking rectifier poled in one sense and switching means and the other branch including a blocking rectifier poled in an opposite sense and switching means, and means for selectively operating either of said switching means to effect dynamic braking through the resistor and the blocking rectifier selected by said switching means.

4. In a system of control, in combination, a wound rotor induction motor having a primary winding connected to be energized from a suitable source of alternating current having a selected voltage and frequency and having a secondary winding provided with a liquid rheostat having relatively movable electrodes for varying the effective resistance of the secondary winding, a pilot motor for moving the electrodes of the rheostat relative to each other, and a generator having two opposing field windings energized respectively at a selected constant value and a value determined by the load current in the primary winding of the induction motor, the excitation effects being so adjusted that the generator has zero output voltage at a selected induction motor load current, said pilot motor being so coupled with the rheostat and so connected to the generator that the electrodes are separated upon a rise of induction motor toward each other when the induction motor load current is kept substantially constant, regardless of the variations in load torque, means for varying the pilot motor speed as a function of the spacing of the rheostat electrodes, dynamic braking circuit means for the pilot motor, said circuit means including a resistor and two parallel branches, one branch including a blocking rectifier poled in one sense and switching means and the other branch including a blocking rectifier poled in an opposite sense and switching means, and means for selectively operating either of said switching means responsive to the polarity of the pilot motor armature potential and the position of the armature to effect dynamic braking through the resistor and the blocking rectifier selected by said switching means.

5. In a system of control, in combination, an alternating-current motor having a primary winding energized from a suitable source of alternating-current and having a secondary winding having at least two terminals, a liquid rheostat having at least two chambers containing an electrolyte and having one fixed electrode in each of the two chambers, said electrode being connected to the terminals of the motor secondary, a pair of electrically connected movable electrodes disposed one in each of the two chambers, a direct-current pilot motor having a constant field excitation for moving the movable electrodes toward, or away from, the fixed electrodes depending on the voltage applied to the armature terminals of the pilot motor, a generator having an armature winding, a pattern field, and a control field wound to oppose the effect of the pattern field, said pilot motor being connected to the armature terminals to be energized by the voltage of the generator, through a pair of reversely connected rectifiers, a pair of normally closed limit switches and a pair of normally open limit switches, means for exciting the control field as a function of the induction motor primary load current, the excitation adjustment of the pattern field and control field being such that the generator produces zero voltage when the induction motor primary load current is at a selected value, dynamic braking circuit means for the pilot motor, said circuit means including a resistor and two parallel branches, one branch including a blocking rectifier poled in one sense and one of said normally open limit switches and the other branch including a blocking rectifier poled in an opposite sense and the other of said normally open limit switches, and means for operating said limit switches at selected armature positions of the pilot motor and when the polarity of the pilot motor armature is such that dynamic braking is effected through the resistor and the particular blocking rectifier selected by the limit switches.

6. In a system of control, in combination, an alternating-current motor having a primary winding energized from a suitable source of alternating current and having a secondary winding having at least two terminals, a liquid rheostat having at least two chambers containing an electrolyte and having one fixed electrode in each of the two chambers, said electrodes being connected to the terminals of the motor secondary, a pair of electrically connected movable electrodes disposed one in each of the two chambers, a direct-current pilot motor having a constant field excitation for moving the movable electrodes toward, or away from, the fixed electrodes depending on the voltage applied to the armature terminals of the pilot motor, a generator having an armature winding, a self-exciting field, a pattern field, and a control field wound to oppose the effect of the pattern field, said pilot motor being connected to the armature terminals to be energized by the voltage of the generator, through a pair of reversely connected rectifiers, a pair of normally closed limit switches and a pair of normally open limit switches, a driving coupling between the pilot motor and the adjustable top to decrease the potentiometer voltage on the pilot motor armature with a decrease in the spacing between the movable and fixed electrodes, means for exciting the control field as a function of the induction motor primary load current, the excitation adjustment of the pattern field and control field being such that the generator produces zero voltage output when the induction motor primary load current is at a selected value, dynamic braking circuit means for the pilot motor, said circuit means including a resistor and two parallel branches, one branch including a blocking rectifier poled in one sense and one of said normally open limit switches and the other branch including a blocking rectifier poled in an opposite sense and the other of said normally open limit switches, and means for operating said limit switches at selected armature positions of the pilot motor and when the polarity of the pilot motor armature is such that dynamic braking is effected through the resistor and the particular blocking rectifier selected by the limit switches.

7. In a system of control, in combination, an alternating-current motor having a primary winding energized from a suitable source of alternating-current and having a secondary winding having at least two terminals, a liquid rheostat having at least two chambers containing an electrolyte and having one fixed electrode in each of the two chambers, said electrodes being connected to the terminals of the motor secondary, a pair of electrically connected movable electrodes disposed one in each of the two chambers, a direct-current pilot motor having a constant field excitation for moving the movable electrodes toward, or away from, the fixed electrodes depending on the voltage applied to the armature terminals of the pilot motor, a generator having an armature winding, a self-exciting field, a pattern field, and a control field wound to oppose the effect of the pattern field, said pilot motor being connected to the armature terminals to be energized by the voltage of the generator, through a pair of reversely connected rectifiers, a pair of normally closed limit switches, and a pair of normally open limit switches, a driving coupling between the pilot motor and the adjustable top to decrease the potentiometer voltage on the pilot motor armature with a decrease in the spacing between the movable and fixed electrodes, means for exciting the control field as a function of the induction motor primary load current, the excitation adjustment of the pattern field and control field being such that the generator produces zero voltage output when the induction motor primary load current is at a selected value, a pair of cams coupled to the pilot motor for actuating said limit switches to open and close them, one cam being so actuated as to open one limit switch and close its associated normally open limit switch when the movable electrodes are at a selected relatively large distance from the fixed electrodes, and the other cam being so actuated as to open the other limit switch and close its associated normally open limit switch when the movable electrodes are at a selected relatively small distance from the fixed electrodes, dynamic braking circuit means for the pilot motor, said circuit means including a resistor and two parallel branches, one branch including a blocking rectifier poled in one sense and one of said normally open limit switches and the other branch including a blocking rectifier poled in an opposite sense and the other of said normally open limit switches, and means for operating said limit switches at selected armature positions of the pilot motor and when the polarity of the pilot motor armature is such that dynamic braking is effected through the resistor and the particular blocking rectifier selected by the limit switches.

8. In a system of control, in combination, an alternating-current motor having a primary winding energized from a suitable source of alternating current and having a secondary winding having at least two terminals, a liquid rheostat having at least two chambers containing an electrolyte and having one fixed electrode in each of the two chambers, said electrodes being connected to the terminals of the motor secondary, a pair of electrically connected movable electrodes disposed one in each of the two chambers, a direct-current pilot motor having a constant field excitation for moving the movable electrodes toward, or away from, the fixed electrodes depending on the voltage applied to the armature terminals of the pilot motor, a generator having an armature winding, a self-exciting field, a pattern field, and a control field wound to oppose the effect of the pattern field, said pilot motor being connected to the armature terminals to be energized by the voltage of the generator, through a pair of reversely connected rectifiers, a pair of normally closed limit switches and a pair of normally open limit switches, a driving coupling between the pilot motor and the adjustable top to decrease the potentiometer voltage on the pilot motor armature with a decrease in the spacing between the movable and fixed electrodes, means for exciting the control field as a function of the induction motor primary load current, the excitation adjustment of the pattern field and control field being such that the generator produces zero voltage output when the induction primary load current is at a selected value, a pair of cams coupled to the pilot motor for actuating said limit switches, one cam being so actuated as to open one limit switch and close its associated normally open limit switch when the movable electrodes are at a selected relatively large distance from the fixed electrodes, and the other cam being so actuated as to open the other limit switch and close its associated normally open limit switch when the movable electrodes are at a selected relatively small distance from the fixed electrodes, the rectifiers being so disposed in the pilot motor armature circuit that the pilot motor will be energized only through a closed limit switch so as to move the electrodes away from a limiting position, dynamic braking circuit means for the pilot motor, said circuit means including a resistor and two parallel branches, one branch including a blocking rectifier poled in one sense and one of said normally open limit switches and the other branch including a blocking rectifier poled in an opposite sense and the other of said normally open limit switches, and means for operating said limit switches at selected armature positions of the pilot motor and when the polarity of the pilot motor armature is such that dynamic braking is effected through the resistor and the particular blocking rectifier selected by the limit switches.

References Cited in the file of this patent

UNITED STATES PATENTS 2,367,025  Huston _____ Jan. 9 1945